United States Patent
Dextreit et al.

(10) Patent No.: US 10,543,830 B2
(45) Date of Patent: Jan. 28, 2020

(54) CONTROL STRATEGY FOR PLUG-IN HYBRID ELECTRIC VEHICLE

(71) Applicant: Jaguar Land Rover Limited, Coventry, Warwickshire (GB)

(72) Inventors: Clement Dextreit, Coventry (GB); David McGeoch, Coventry (GB); Michael Andrews, Coventry (GB); Kean Harrison, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 184 days.

(21) Appl. No.: 15/551,011

(22) PCT Filed: Feb. 25, 2016

(86) PCT No.: PCT/EP2016/054032
§ 371 (c)(1),
(2) Date: Aug. 14, 2017

(87) PCT Pub. No.: WO2016/135269
PCT Pub. Date: Sep. 1, 2016

(65) Prior Publication Data
US 2018/0029589 A1 Feb. 1, 2018

(30) Foreign Application Priority Data
Feb. 25, 2015 (GB) .................... 1503104.0

(51) Int. Cl.
*B60W 10/06* (2006.01)
*B60W 10/08* (2006.01)
(Continued)

(52) U.S. Cl.
CPC ............... *B60W 20/16* (2016.01); *B60K 6/44* (2013.01); *B60W 10/06* (2013.01); *B60W 10/08* (2013.01);
(Continued)

(58) Field of Classification Search
CPC ......... B60K 6/44; B60W 10/06; B60W 10/08; B60W 10/26; B60W 20/13; B60W 20/16;
(Continued)

(56) References Cited

U.S. PATENT DOCUMENTS 5,414,994 A * 5/1995 Cullen ............... F02D 41/1441
60/274
6,286,993 B1 9/2001 Boll
(Continued)

FOREIGN PATENT DOCUMENTS

CN 103661361 A 3/2014
FR 2 950 593 A1 4/2011
(Continued)

OTHER PUBLICATIONS

Patents Act 1977: Combined Search and Examination Report under Sections 17 and 18(3), GB Application No. GB1503104.0, dated Jul. 30, 2015, 5 pp.
(Continued)

*Primary Examiner* — Anshul Sood
(74) *Attorney, Agent, or Firm* — Myers Bigel, P.A.

(57) ABSTRACT

A method of controlling a plug-in hybrid electric vehicle including an electric propulsion system, an engine, and a catalytic converter associated with the engine, the method comprising: monitoring a state of charge of a battery of the vehicle when in a charge depletion mode; determining a rate of depletion of the state of charge; estimating from the rate of depletion a duration of a depletion period representing the time remaining until a minimum state of charge of the battery will be reached; determining a duration of a warming period of the catalytic converter; comparing the duration of the depletion period and the duration of the warming period;
(Continued)

and activating the engine if the duration of the depletion period is less than or equal to the duration of the warming period.

15 Claims, 4 Drawing Sheets

(51) Int. Cl.
| | |
|---|---|
| *B60W 10/26* | (2006.01) |
| *B60W 20/13* | (2016.01) |
| *B60W 20/16* | (2016.01) |
| *B60W 20/40* | (2016.01) |
| *B60K 6/44* | (2007.10) |
| *F02N 11/08* | (2006.01) |
| *F01N 9/00* | (2006.01) |
| *F02D 41/02* | (2006.01) |
| *F02D 41/06* | (2006.01) |

(52) U.S. Cl.
CPC ............ *B60W 10/26* (2013.01); *B60W 20/13* (2016.01); *B60W 20/40* (2013.01); *F01N 9/005* (2013.01); *F02D 41/024* (2013.01); *F02D 41/065* (2013.01); *F02N 11/084* (2013.01); *F02N 11/0825* (2013.01); *B60W 2510/244* (2013.01); *B60W 2530/12* (2013.01); *B60W 2550/12* (2013.01); *B60W 2710/065* (2013.01); *B60W 2710/244* (2013.01); *F02N 2200/026* (2013.01); *F02N 2200/061* (2013.01); *Y02T 10/26* (2013.01); *Y02T 10/47* (2013.01); *Y02T 10/48* (2013.01); *Y02T 10/54* (2013.01); *Y02T 10/623* (2013.01); *Y02T 10/6291* (2013.01); *Y02T 90/14* (2013.01)

(58) Field of Classification Search
CPC ...... B60W 20/40; F01N 9/005; F02D 41/024; F02D 41/065
See application file for complete search history.

(56) References Cited

U.S. PATENT DOCUMENTS

| | | | |
|---|---|---|---|
| 6,336,063 | B1 | 1/2002 | Lennevi |
| 2002/0063002 | A1 | 5/2002 | Lasson |
| 2005/0216176 | A1* | 9/2005 | Ichimoto ............... F02D 41/065 701/112 |
| 2014/0288736 | A1 | 9/2014 | Martin et al. |

FOREIGN PATENT DOCUMENTS

| | | |
|---|---|---|
| JP | 2010-195350 A | 9/2010 |
| JP | 2014-80163 A | 5/2014 |
| WO | WO 2011/024038 A2 | 3/2011 |

OTHER PUBLICATIONS

Patents Act 1977: Combined Search and Examination Report under Sections 17 and 18(3), GB Application No. GB1603313.6, dated Aug. 10, 2016, 6 pp.

International Search Report and Written Opinion of the International Searching Authority, International Application No. PCT/EP2016/054032, dated Jul. 22, 2016, 19 pp.

First Office Action and English language translation, CN Application No. 201680011447.6, dated Dec. 19, 2018, 18 pp.

\* cited by examiner

CONTROL STRATEGY FOR PLUG-IN HYBRID ELECTRIC VEHICLE

RELATED APPLICATIONS

This application is a 35 U.S.C. § 371 national stage application of PCT Application No. PCT/EP2016/054032, filed on Feb. 25, 2016, which claims priority from Great Britain Patent Application No. 1503104.0, filed on Feb. 25, 2015, the contents of which are incorporated herein by reference in their entireties. The above-referenced PCT International Application was published in the English language as International Publication No. WO 2016/135269 A1 on Sep. 1, 2016.

TECHNICAL FIELD

The present disclosure relates to a control strategy for a plug-in hybrid electric vehicle. In particular, but not exclusively, the disclosure relates to a strategy for controlling warm-up of a catalytic converter of such a vehicle. Aspects of the disclosure relate to a method, to a control system, to a vehicle, to a processor, to a computer program product and to a computer readable medium.

BACKGROUND

Plug-in hybrid electric vehicles (PHEVs), similarly to conventional hybrid vehicles, include an electric propulsion system working alongside an internal combustion engine to provide motive power for the vehicle. As a result of the common features, PHEVs share many advantages with conventional hybrid vehicles in terms of driving efficiency.

As with conventional hybrids, in a plug-in hybrid electric vehicle the architecture can either take a parallel arrangement or a series arrangement. In a parallel arrangement, both the engine and the electric propulsion system can supply torque directly to a vehicle transmission. Typically the vehicle alternates between the two sources of torque, although at certain times the two sources are used in combination, for example during acceleration from low speed. In pure series arrangements, torque is supplied to the transmission by the electric propulsion system at all times, and the engine is used only as a generator to provide electrical power to the electric propulsion system. In other arrangements, such as 'powersplit' or 'series-parallel' configurations, the electric propulsion system and the engine can drive the vehicle wheels independently or in combination as required, with the engine acting as a generator when needed.

Relative to conventional hybrid vehicles, PHEVs offer the advantage that a battery of the vehicle can be charged from an external power source when the vehicle is not in use, in the same manner as an electric vehicle. As with electric vehicles, this allows a PHEV to operate in a purely electric mode over a significant distance, known as its 'all-electric range'. In contrast, in a conventional hybrid vehicle the total electrical energy available for motive effort is much lower, since all electrical energy stored in the vehicle battery is recovered internally, for example through regenerative braking. Therefore, the distance that a conventional hybrid vehicle can cover in a purely electric mode is much more restricted than for a PHEV.

PHEVs are typically operated in two distinct modes: a charge depletion mode, in which battery charge is used at a relatively high rate; and a charge sustain mode, in which the vehicle is operated so as to maintain the battery charge within a defined tolerance band. These modes of operation are each described in more detail below.

The charge depletion mode corresponds to pure electric operation in which the internal combustion engine is inactive, and the vehicle is entirely driven by the electric propulsion system. Therefore, in this mode the level of charge stored in the vehicle battery (referred to hereafter as the 'state of charge', or 'SoC') is consumed relatively quickly. The rate at which charge is depleted varies according to the load that is applied to the electric propulsion system, which is primarily determined by the way in which the vehicle is driven. For example, aggressive driving characterised by hard acceleration depletes battery charge more rapidly, with more charge being expended per mile of travel, than more sedate driving. Therefore, aggressive driving reduces the all-electric range of the vehicle. Similarly, the load applied to the PHEV will also influence the all-electric range, for example if towing a load, or if driving on an inclined surface. A further consideration is that internal electrical loads, particularly air conditioning systems and entertainment systems, can have a significant effect on the all electrical range.

On starting the engine, the vehicle enters charge depletion mode provided that the initial SoC of the battery is sufficient. While the vehicle operates in charge depletion mode the SoC drops gradually until it reaches a minimum level below which the battery cannot support continued electric operation. At this point, the vehicle switches to the charge sustain mode. As the rate at which charge is depleted is dependent on the manner in which the vehicle is driven, the point at which the transition between modes occurs varies, and is not known in advance. For this reason, the charge sustain mode does not, for example, activate after a certain time period or a certain distance, but is instead triggered with reference to the ability of the battery to support driver demand, for example represented by a predetermined threshold level of charge in the vehicle battery.

Upon entering charge sustain mode the internal combustion engine is started, and the PHEV operates in generally the same manner as a conventional hybrid: for a parallel arrangement the engine becomes the primary source of motive power for the vehicle, and the electric propulsion system is used in parallel with the engine for optimal overall powertrain efficiency. For a series arrangement, the electric propulsion system continues to drive the transmission, but the engine charges the battery to compensate for subsequent electrical power demands.

In this mode the vehicle is controlled so as to maintain the SoC of the battery close to the threshold value that is used to trigger the charge sustain mode initially. This means that when the electric propulsion system is used, for example to aid in moving the vehicle away from a stationary position, the battery charge is replenished from internal sources such as regenerative braking or direct generation from the internal combustion engine.

It is noted that the vehicle continues in charge sustain mode until the battery is next charged from an external power source to raise its SoC above the minimum level. This is primarily because using electrical energy supplied from a grid is typically more economical and more energy efficient than using the engine to charge the electric machine; it would be relatively inefficient and costly to fully recharge the battery using the engine as a generator. Therefore, it is typically preferable to use the engine to maintain the SoC at a minimum level, within a certain tolerance band, and then recharge fully from an external source when the vehicle is not in use.

A problem arises in the PHEV arrangement in that when the engine is started during the transition between the charge depletion and charge sustain modes, components of an engine exhaust gas after-treatment system attached to the engine, such as catalytic converters, are at approximately ambient temperature. The skilled reader will appreciate that catalytic converters do not act to catalytically convert pollutants in exhaust gases until operating in excess of 550° C. It takes approximately 20 seconds for this temperature to be reached from an ambient of 20° C. if the engine is operating specifically for the purpose of heating exhaust gases.

Of particular concern are $NO_x$ emissions from the engine, and which the engine exhaust after-treatment system is arranged to manage. Many countries apply restrictions to vehicle $NO_x$ emissions, and if the vehicle operates with a catalytic converter below the optimal temperature for a prolonged period it is possible that the emissions may exceed defined limits in those countries.

In a conventional combustion engine powered vehicle, there is typically a period of engine idling following engine start before the vehicle moves away. The catalytic converter warms during this time such that it is effectively treats the exhaust gasses when load is subsequently applied to the engine. Warming of the exhaust gas after-treatment system may be optimised, for example, by using a high engine idling speed while a crankshaft of the engine is not coupled to a driveline of the vehicle, and/or by tuning the combustion to optimise generation of heat.

In contrast, in the PHEV arrangement, load could be applied to the engine almost immediately after engine start, and so the catalytic converter has not had time to warm. There is therefore a risk of exceeding emissions limits for a short period following transition from charge depletion mode to charge sustain mode.

It is against this background that the present invention has been devised.

SUMMARY OF THE INVENTION

According to an aspect of the invention, there is provided a method of controlling a plug-in hybrid electric vehicle including an electric propulsion system, an engine, and a catalytic converter associated with the engine, the vehicle being operable in a charge depletion mode and in a charge sustain mode. When the vehicle is operating in the charge depletion mode the method comprises monitoring a state of charge of a battery of the vehicle, determining a rate of depletion of the state of charge, estimating from the rate of depletion a duration of a depletion period representing the time remaining until a minimum state of charge of the battery will be reached. When the vehicle is operating in the charge depletion mode the method further comprises determining a duration of a warming period of the catalytic converter, comparing the duration of the depletion period and the duration of the warming period, and activating the engine if the duration of the depletion period is less than or equal to the duration of the warming period. The method further comprises switching the vehicle from operating in the charge depletion mode to the charge sustain mode when the battery of the vehicle reaches the minimum state of charge.

The method may comprise monitoring an ambient temperature, and determining the warming period on the basis of the ambient temperature and a predetermined engine speed at which the engine is to be driven during the warming period. In this embodiment, the predetermined engine speed may correspond to engine idling, or alternatively the predetermined engine speed may be an elevated speed relative to engine idling.

Determining the warming period may include determining a cooling rate of the catalytic converter.

The cooling rate may be determined based on a measure of mass air flow across the catalytic converter.

The method may comprise monitoring an ambient pressure, and determining the warming period on the basis of the ambient pressure.

Determining the warming period may include obtaining a predetermined look-up value of the warming period, to minimise the required processing power.

Determining the warming period may include determining the time elapsed since the catalytic converter was last operated.

Comparing the duration of the depletion period with the duration of the warming period may comprise determining a state of charge threshold and comparing the state of charge threshold with the state of charge of the battery to determine when the duration of the depletion period is less than or equal to the duration of the warming period. In this embodiment, the method may comprise assigning indices to ranges of states of charge, defining a threshold index containing the state of charge threshold, and comparing the state of charge of the battery with a boundary of the threshold index to determine when the duration of the depletion period is less than or equal to the duration of the warming period.

The method may comprise determining a first rate of depletion of the state of charge over a first time period, and determining a second rate of depletion of the state of charge over a second time period, wherein the first time period and the second time period overlap.

According to another aspect of the invention, there is provided a control system for a plug-in hybrid electric vehicle including an electric propulsion system, an engine, and a catalytic converter associated with the engine, the vehicle being operable in a charge depletion mode and in a charge sustain mode. The control system comprises sensing means arranged to monitor a state of charge of a battery of the vehicle when in the charge depletion mode, processing means arranged, when in the charge depletion mode, to determine a rate of depletion of the state of charge, to estimate from the rate of depletion a depletion period representing the time remaining until a minimum state of charge will be reached, and to determine a duration of a warming period of the catalytic converter, and output means arranged when in the charge depletion mode to activate the engine if the depletion period is less than or equal to the warming period, the output means further being arranged to switch the vehicle from operating in the charge depletion mode to the charge sustain mode when the battery of the vehicle reaches the minimum state of charge.

In other aspects the invention also extends to a computer program product executable on a processor so as to implement the method of the invention, to a non-transitory computer readable medium loaded with the computer program product of claim 10, to a processor arranged to implement the method or the computer program product of the invention, and to a vehicle arranged to implement the method of the invention, or comprising the control system or the processor of the invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the present invention will now be described, by way of example only, with reference to the accompanying drawings, in which like components are assigned like numerals, and in which.

DETAILED DESCRIPTION

Figure 1:
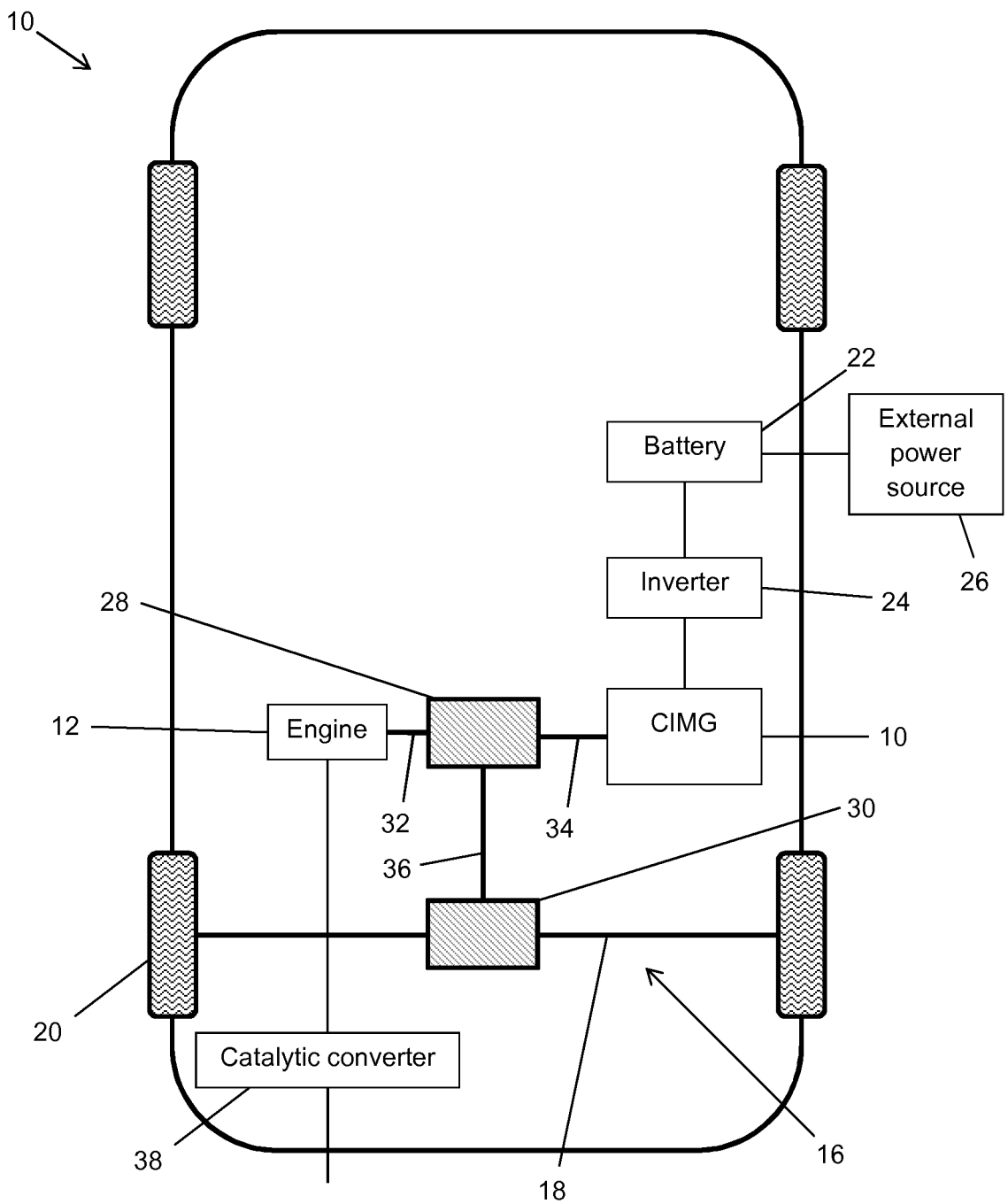
FIG. 1 is a schematic drawing of an example of a known architecture of a plug-in hybrid electric vehicle suitable for use with embodiments of the present invention.

FIG. 1 shows in schematic form a simplified architecture for a PHEV 10. The arrangement depicted is of the 'powersplit' type that will be familiar to the skilled reader, although it should be appreciated that this architecture is referred to by way of example only; embodiments of the invention could find application in many alternative architectures, for example in pure 'series' or 'parallel' type arrangements.

As this architecture is well known in the art, it is described in broad terms only so as to provide context for the embodiments of the invention that are introduced subsequently. It should be understood that this architecture operates according to the principles of a PHEV outlined above.

The PHEV 10 includes an internal combustion engine 12 arranged to operate in parallel with an electric propulsion system in the form of a combined integrated motor generator (CIMG) 14. The CIMG 14 is operable either as an electric motor or as a generator. Both the engine 12 and the CIMG 14 can supply torque to a transmission 16, which via a driveline drives one or more axles 18 carrying a pair of wheels 20.

The engine 12 is also operable to drive the CIMG 14 as a generator to produce electrical energy to be stored in a battery 22 of the vehicle. An inverter 24 disposed between the CIMG 14 and the battery 22 converts a raw electrical output of the CIMG 14 into a suitable battery input. The inverter 24 can also operate in reverse to allow the CIMG 14 to draw power from the battery 22 to produce torque. The battery 22 includes an input 26 configured for connection with an external electrical power source such as a grid supply, enabling full recharging of the battery 22 over an extended period when the PHEV 10 is not in use.

The transmission 16 includes first and second differential gears 28, 30 which transfer torque between components of the system. The first differential gear 28 is coupled to an output shaft 32 of the engine 12, an input/output shaft 34 of the CIMG 14, and a driveshaft 36 associated with the transmission 16. The first differential gear 28 is configured such that when the engine 12 outputs torque, both the driveshaft 36 and the CIMG 14 are driven. Conversely, when the engine 12 is inactive, the CIMG 14 can drive the driveshaft 36. In this way, the transmission 16 facilitates an isolating arrangement in which the engine 12 and the CIMG 14 can each drive the transmission 16 independently of the other. Alternatively, the engine 12 and the CIMG 14 can drive the driveshaft 36 simultaneously. In an alternative embodiment, a clutch is provided between the engine 12 and the first differential gear to provide complete isolation of the engine 12 as required.

The driveshaft 36 is disposed orthogonally with respect to the axle 18, and the second differential gear 30 is used to accommodate the change in angle. The second differential gear 30 also provides an appropriate rotational speed adjustment between the driveshaft 36 and the axle 18.

An exhaust system is provided to direct exhaust gases away from combustion chambers of the engine 12. The exhaust system includes an exhaust gas after-treatment system comprising a catalytic converter 38 that reduces pollutants such as $NO_x$ in the exhaust gases. As noted above, the catalytic converter 38 is only fully effective once it reaches its operating temperature. In turn, the catalytic converter 38 relies on passage of hot exhaust gases through it to raise its temperature. Therefore, if the catalytic converter 38 has not been operated recently and so is at ambient temperature, it remains at ambient temperature while the engine 12 is inactive. If the catalytic converter 38 is already warm following recent operation, it cools towards ambient temperature while the engine 12 is not running.

A warming period, defined as the time taken for the catalytic converter 38 to reach its operating temperature, is determined by a combination of its starting temperature, the rate of warming, and the target operating temperature. If the catalytic converter 38 has not been warmed recently, the starting temperature is governed primarily by the ambient temperature. Otherwise, the starting temperature is determined by the time elapsed since it was last operated, in combination with a cooling rate which is governed by the ambient temperature. It is also noted that the catalytic converter 38 cools more quickly when the vehicle is moving due to air flow across the converter. It is further noted that the starting temperature may be governed by an ambient pressure of the air.

The rate of warming varies according to the flow rate and heat flux of exhaust gases through the catalytic converter 38, which is in turn determined by the engine speed and load, along with other engine settings such as ignition angle and injector timing. This warming is offset to some extent by air flow across the catalytic converter 38 as a result of vehicle movement, as noted above. Therefore, if the ambient temperature, the vehicle speed, and the engine speed and load are known, the duration of the warming period for a given target temperature can be estimated.

Figure 2:
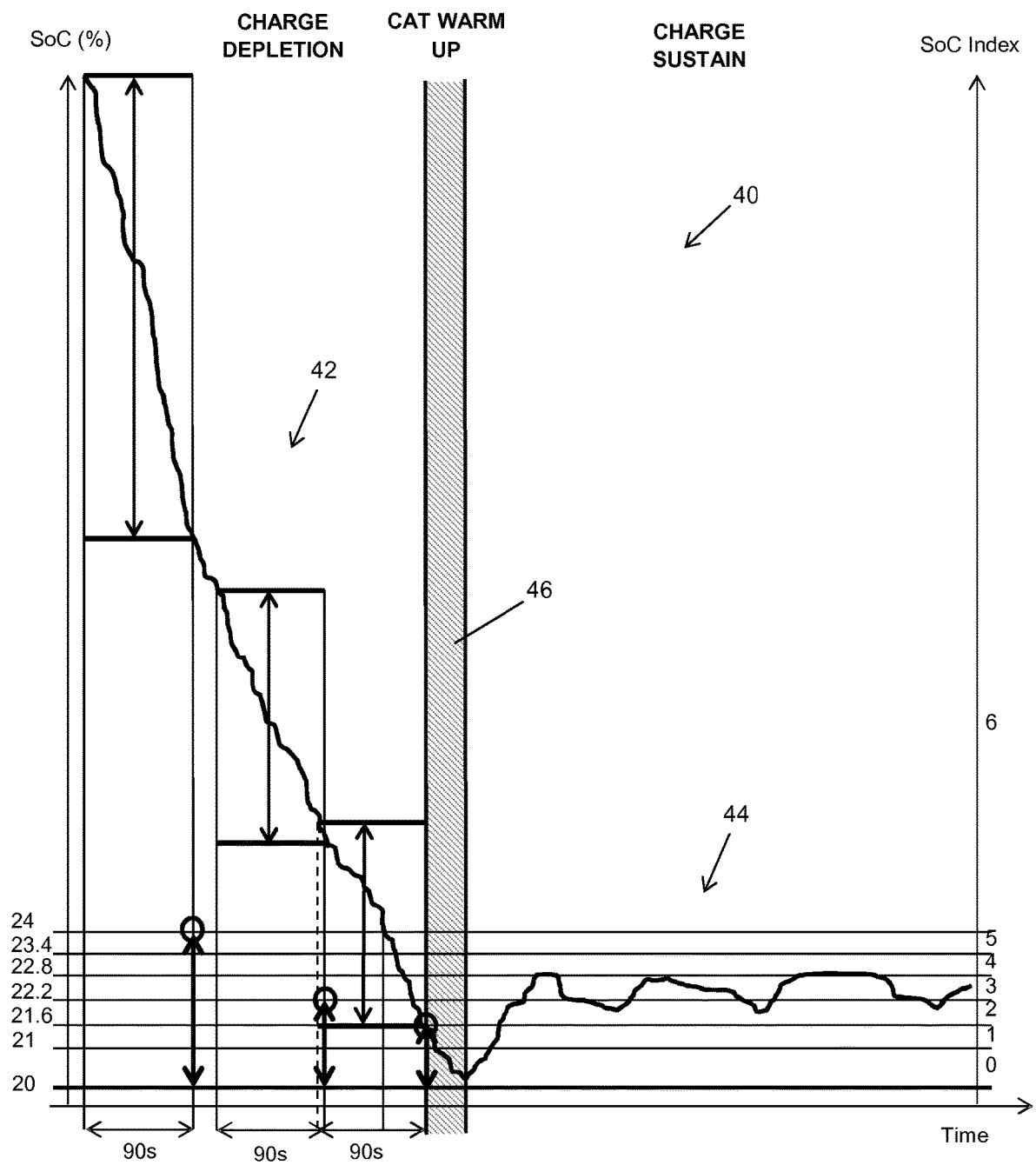
FIG. 2 is a graph showing the state of charge of a PHEV battery over time.

Turning now to FIG. 2, an example of a battery SoC profile 40 over a typical driving cycle is illustrated. The drive cycle includes an initial period of operation in charge depletion mode, giving rise to a first portion 42 of the graph in which the SoC falls generally linearly. This is followed by a period of operation in charge sustain mode, commencing just before the SoC reaches a minimum level of 20%, resulting in a second portion 44 of the graph in which the SoC value is maintained above this minimum level, oscillating slightly about a constant level of approximately 22.5%.

While the SoC profile 40 during charge depletion mode follows a generally linear trend, it is clear that the gradient of the line, corresponding to the depletion rate of the SoC, is variable.

As noted above, this is due to the fact that driving parameters such as acceleration demand impact the SoC depletion rate. As a consequence, the point in time at which the SoC will reach the minimum threshold value to trigger charge sustain mode is not known in advance.

However, advantageously, by measuring the gradient of the graph line over any given time period, an estimate can be made of the time at which the minimum SoC will be reached, referred to hereafter as the transition point. This estimate provides a helpful indication of when loading of the engine 12 will be required (i.e. when switching from the charge depletion mode to the charge sustain mode will be required), thereby enabling the engine 12 to be prepared for use in advance of this moment. The estimate could be refined by also including data from a GNSS system of the vehicle to enable enhanced prediction of future driver demand.

In particular, this means that the engine 12 can be started in anticipation of demand in order to allow time for the catalytic converter 38 to warm and become effective before the engine 12 provides drive to road wheels 20. Therefore, the catalytic converter 38 can be made operational prior to the transition point, and so there is a reduced risk of exceeding emissions restrictions over the range of driving cycles.

In order to achieve this, the duration of the warming period must also be known. As mentioned above, this can be estimated from the ambient temperature, which can be obtained from on-board sensors included for other purposes, and the engine speed, which is predetermined. Therefore, the duration of the warming period can be estimated. Using this estimate in combination with the predicted transition point, the time at which the engine 12 should be started to allow sufficient time for the catalytic converter 38 to warm can be determined.

A subtle benefit of this approach is that it ensures that the engine 12 does not run for longer than needed to warm the catalytic converter 38, therefore preventing it from intruding on the all-electric range. To illustrate this point, a more crude arrangement is considered in which a simple predetermined SoC threshold is used to trigger start of the engine 12 in advance of the transition point. In such an approach, the threshold is necessarily set to a level above a point corresponding to a maximum possible SoC depletion rate, to ensure that sufficient time is provided for the catalytic converter 38 to warm regardless of how the PHEV 10 is driven, or the loading applied to the engine 12. This would result in the engine 12 running for longer than necessary for all but the most aggressive driving profiles. In contrast, the present invention ensures that smooth drivers enjoy an extended period of electric operation compared with more aggressive drivers, whilst ensuring that legislative emissions targets are met.

The implementation of the above prediction method is illustrated in the graph of FIG. 2 by a narrow cross-hatched band 46 at the intersection between the two portions of the graph, which represents the warming period of the catalytic converter 38. As shown in the graph, the warming period begins in advance of the transition point; this is clear from the fact that the SoC continues to fall during the warming period, which is indicative of the PHEV 10 continuing to operate in charge depletion mode throughout this time. As a result, load is only applied to the engine 12 after completion of the warming period, thereby avoiding undesirable emissions of pollutants such as $NO_x$.

It will be appreciated that the predicted transition point varies according to the changing gradient of the SoC over time. For this reason, it is envisaged that the gradient measurement will be regularly or continually updated, so as to provide as accurate a prediction of the transition point as possible at all times. For example, FIG. 2 shows three separate measurements of the gradient of the line, from which three corresponding predictions of the transition point can be calculated. A method for calculating and using the predicted transition point is described in more detail later with reference to FIG. 4.

It is noted that in this example, each measurement is taken over a 90 second period so as to produce an average gradient value that is not sensitive to short-term fluctuations. It will be appreciated that the length of the period used to calculate the gradient could vary significantly, to ensure that fluctuations arising from transient influences such as waiting at a junction, or hard acceleration when overtaking, are filtered out.

Additionally, it should be noted that the gradient calculation is conducted with increasing frequency in FIG. 2, insofar as the time between the first calculation and the second calculation is larger than the time between the second and third calculations. This is because as the transition point approaches it becomes important to update the prediction more regularly. For improved accuracy, the measurement periods can be overlapped, such that the predicted transition time is updated every two seconds for example, without changing the duration of the period over which the gradient is measured. In this way a dynamic prediction output can be provided.

For convenience, indices may be used to represent bands of SoC values. Index values are included in FIG. 2 on the vertical axis to the right of the graph, taking values from 0 to 6.

The index containing the predicted transition point can be identified, and an upper boundary of that index can be used as the trigger for engine start.

Since the prediction of the transition point is inherently imprecise, the use of indices simplifies the implementation of the prediction method and accommodates calculation tolerances. It is noted that the indices do not cover uniform bands of SoC values: for enhanced accuracy the bands become narrower in the area of interest in which engine start is likely to be triggered.

Figure 3:
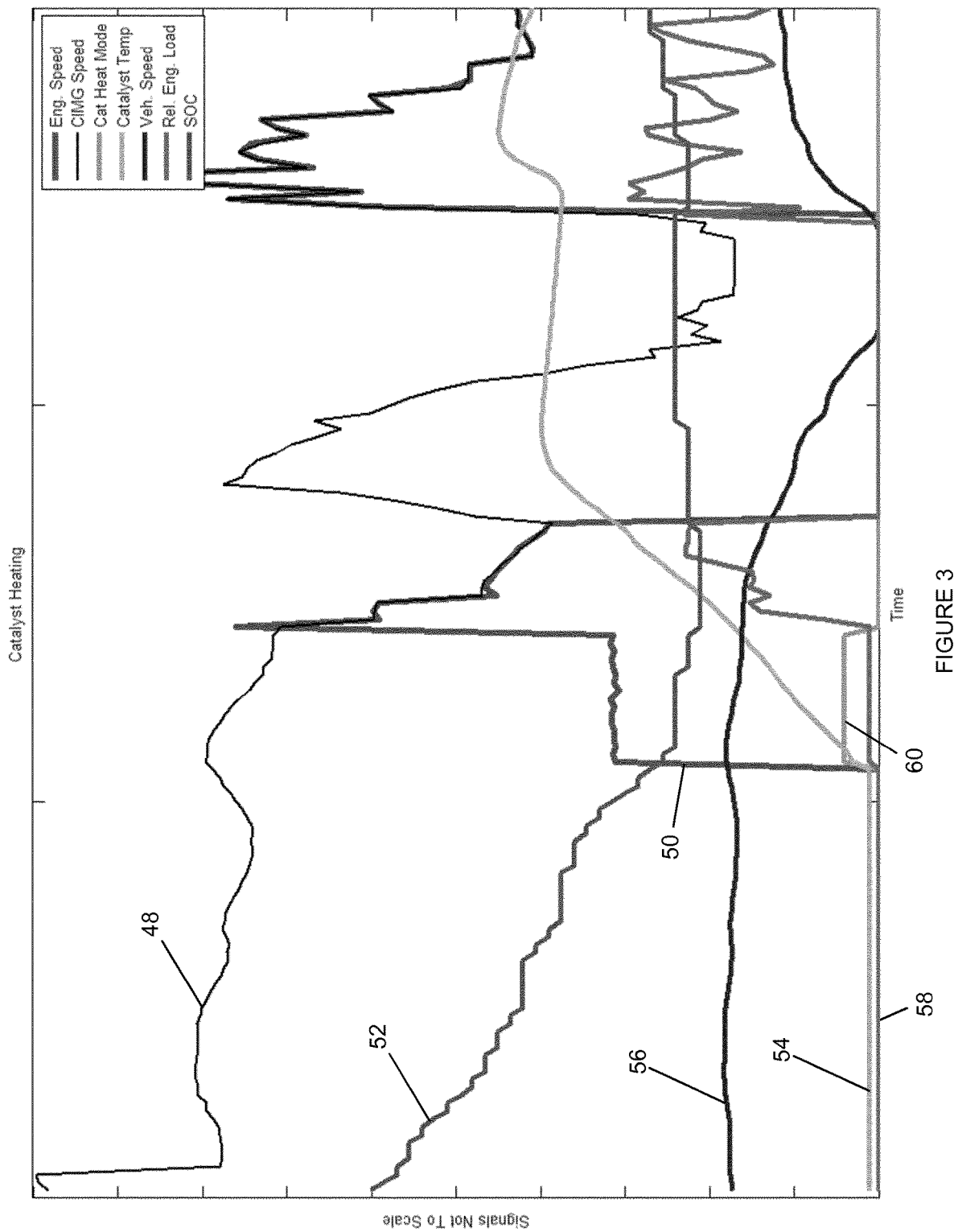
FIG. 3 is a graph showing a range of vehicle parameters over time for a period including a transition between charge depletion mode and charge sustain mode.

Moving on to FIG. 3, a range of operating parameters for the PHEV 10 are represented over a typical driving cycle. The graph of FIG. 3 represents a shorter time period than the FIG. 2 graph, although the transition period remains approximately at the centre of the x-axis in FIG. 3. The y-axis scale for each line is not shown: the graph lines are presented in a manner that enables straightforward comparison with one another, with the general trends shown; the absolute magnitude of the y-values of each line is not required for this purpose.

FIG. 3 plots seven variables, including: the speed of the CIMG 48; the engine speed 50; the SoC of the battery 52; the catalyst temperature in the catalytic converter 54; the vehicle speed 56; the relative load on the engine 58; and catalytic converter heating activity 60.

The SoC 52, which is plotted centrally in the graph, is indicative of the operating mode of the PHEV 10, and so acts as a reference point by which other variables shown in the figure can be understood.

As in FIG. 2, in FIG. 3 the SoC 52 has an initial period of falling gradually, corresponding to charge depletion mode operation. As would be expected, during this time the CIMG speed 48 is relatively high since it is providing motive power for the PHEV 10, whereas the engine speed 50 is at a minimum indicating that it is inactive. As the engine 12 is inactive, the catalytic converter 38 is not heated. This is represented in the lowermost line 60, which is a digital indication of whether the engine is acting purely to heat the catalytic converter 38, as a minimum. The fact that the catalytic converter 38 is not heated during this period is also reflected in the plot of the catalyst temperature 54 which exhibits no change in this period.

About one third of the way through the illustrated time period, a rise in engine speed 50 indicates engine start. This commences warming of the catalytic converter 38 in readiness for subsequent loading of the engine 12, as described above. This is reflected in FIG. 3 in that the lowermost line 60 is at a maximum during this period, indicating that the engine is operating only to warm the catalytic converter 38. In this embodiment, the engine 12 is allowed to idle during the warming period, which is reflected in the graph with the engine speed 50 at a constant, relatively low level. It is noted that the idling speed is taken into account in the estimation of the duration of the warming period.

There are several advantages to allowing the engine 12 to idle during the warming period. Firstly, minimal fuel is consumed, leading to low emissions. This helps to ensure that pollutants are not released in excessive quantities during this time. Secondly, no energy is wasted in overcoming a load if the engine 12 is idling, meaning that heat generated from fuel combustion is transferred to the catalytic converter 38 as efficiently as possible. A final consideration is that idling generates minimal noise and vibration, which is a benefit in terms of user perception.

However, in other embodiments the engine speed 50 could be raised above idling during the warming period in order to increase the flow rate of hot exhaust gases through the catalytic converter 38 and so warm it more rapidly. While this may reduce some of the benefits described above, this is balanced by a reduced warming period.

Once the engine 12 is running, the catalytic converter 38 begins to warm. This is represented in the lowermost line 60 as a maximum, providing a digital indication that the catalyst is being heated. This is reflected in the plot of catalyst temperature 54, which rises steadily during this period.

Since the PHEV 10 continues to operate in charge depletion mode during the warming period, the SoC 52 continues to fall, and the CIMG speed 48 remains elevated.

The initial period, which includes the warming period, ends around half way through the illustrated period. This is followed by a period in which the SoC 52 remains at a substantially constant value, corresponding to operation in charge sustain mode. Accordingly, the engine speed 50 rises in this period as it takes over the burden of supplying motive power, apart from at times where the engine load 58 is zero.

The vehicle speed 56 throughout the drive cycle provides further context for the changes exhibited in the other variables. FIG. 3 corresponds to a vehicle certification cycle derived from real-world drive cycles, and so includes periods of acceleration, deceleration, and steady speed. There is also a period in which the PHEV 10 is stationary. Engine load 58 is zero while the vehicle is decelerating or at rest.

In the initial period when the PHEV 10 operates in charge depletion mode, it is clear that the SoC 52 depletes at a generally constant rate, which corresponds to a generally constant vehicle speed 56. If the vehicle were to accelerate or decelerate sharply, this would be reflected in the SoC trend. This illustrates how the driving profile influences the transition time, and therefore why it is necessary to continuously or periodically recalculate the gradient of the SoC line 52 to provide an updated prediction.

Once the PHEV 10 assumes charge sustain mode operation, the driver demand torque influences the interaction between the CIMG 14 and the engine 12. For example, it is apparent that in some periods the CIMG 14 and the engine 12 operate together in parallel, for example as the vehicle accelerates from a stationary position; this is because the CIMG 14 is used to compensate for the relatively poor efficiency of the engine 12 in this scenario. Prior to this, the engine 12 stops as the PHEV 10 comes to rest, allowing the CIMG 14 to recover energy not wasted in friction during braking, and ensuring that fuel is not wasted while the PHEV 10 is stationary. This is consistent with a 'start-stop' control regime that will be familiar to the skilled reader.

The high CIMG speed 48 shown during vehicle deceleration is indicative of the CIMG 14 being driven as a generator by the wheels 20 during these times to recover electrical energy to ensure that the SoC is maintained above the minimum level.

The relative load 58 on the engine 12 adds a final layer of information to aid the reader's understanding. It is noted that no load 58 is applied to the engine 12 when it is inactive.

Following engine start, a minimal load 58 is applied to the engine 12 to induce idling while the catalyst is heated. Once the PHEV 10 enters charge sustain mode, the loading 58 on the engine 12 immediately increases as torque is arbitrated between the engine 12 and CIMG 14 to provide tractive effort to the wheels 20. From that point onwards, the loading 58 varies according to driver demand, as reflected in the changing vehicle speed 56.

Figure 4:
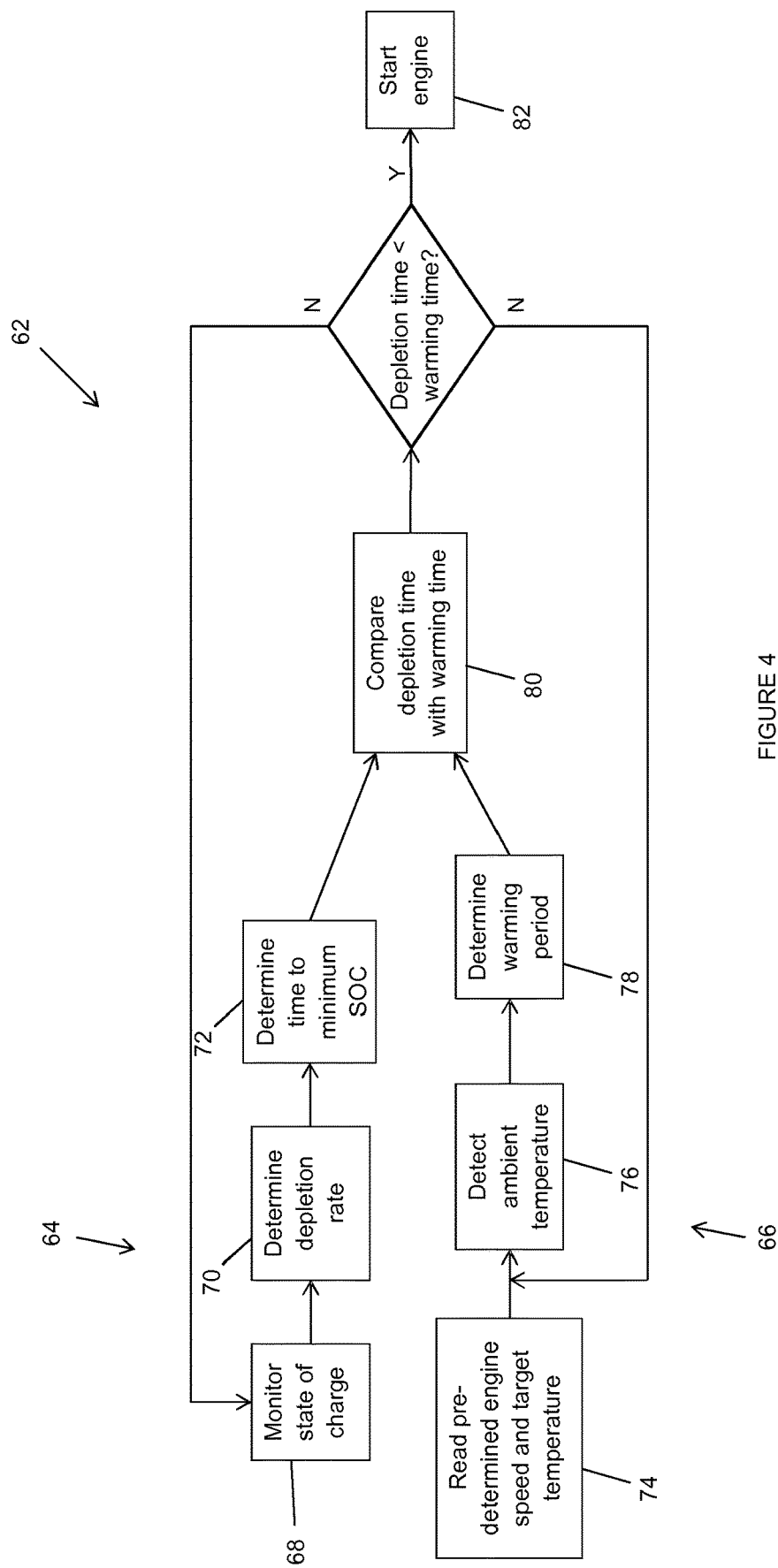
FIG. 4 is a flow diagram showing a method of controlling a PHEV according to an embodiment of the invention.

FIG. 4 illustrates a process 62 for predicting engine demand and for starting the engine 12 in advance for preparation of the catalytic converter 38. In this embodiment the process 62 is performed by a dedicated controller, although in alternative embodiments a standard controller of the vehicle may be used to the same effect, for example a powertrain control module. To perform its function, the dedicated controller includes inputs that receive signals indicative of the vehicle parameters relevant to determining the transition point and the warming period, such as the engine speed, the battery SoC, etc.

The process 62 involves two concurrent sub-processes 64, 66, a first 64 to predict the time to the transition point, and a second 66 to estimate the warming period.

The first sub-process 64 begins with monitoring at step 68 the SoC of the battery 22 over a pre-defined time period, for example 30 seconds. The change in SoC during this time is determined, and from this a depletion rate is calculated at step 70 as the quotient of the change in SoC with the time elapsed. Then, a depletion period defined as the time until the minimum SoC is reached is determined at step 72 based on the calculated depletion rate.

Meanwhile, the second sub-process 66 begins with reading at step 74 from an internal memory associated with the controller a predetermined engine speed at which the engine 12 is to be driven during the warming period, and a target temperature for the catalytic converter 38. The controller then detects at step 76 an ambient temperature using an input from an on-board temperature sensor. Then, an estimated duration of the warming period is determined at step 78, using the initial and target temperatures to determine the temperature difference, and the engine speed to estimate a warming profile. A safety factor may be applied to the warming period to ensure that the catalytic converter 38 has sufficient time to warm.

The process 62 then continues by comparing at step 80 the outputs from the first and second sub-processes 64, 66, namely the depletion period and the warming period. If the duration of the depletion period is equal to or less than that of the warming period, the engine 12 is started at step 82. If the depletion period is larger than the warming period, it is too early to start the engine 12. Therefore, the process 62 returns to reiterate the first and second sub-processes 64, 66 so as to obtain an updated depletion period, and also to update the warming period if there is a change in ambient temperature. As the predetermined engine speed during the warming period is fixed, when the second sub-process 66 re-iterates it starts from the step of monitoring the ambient temperature.

In an alternative embodiment, at the comparison step 80 the warming period and the depletion period are used to determine a threshold SoC that will be used to trigger engine start. In this embodiment, an error-factor can optionally be applied to the SoC threshold rather than to the warming period.

It will be appreciated by a person skilled in the art that the invention could be modified to take many alternative forms to that described herein, without departing from the scope of the appended claims.

For example, while the invention is described above in the context of a powersplit hybrid architecture, as noted previously embodiments of the invention could be used in a pure series or parallel hybrid architecture. In this case, the PHEV 10 switches between charge depletion mode and charge sustain mode in the same manner as in the parallel arrangement, with the difference being that the engine 12 is used solely to charge the battery 22 in charge sustain mode. The skilled reader will appreciate that the above described problems with emissions at engine start will be equally prevalent in a series arrangement, and so the same principle of starting the engine early in anticipation of demand applies.

In the above described examples a warming period is estimated based on vehicle parameters, however in another embodiment a predetermined warming period is used in order to simplify the process.

Further aspects of the present invention are set out in the following numbered paragraphs:

1. A method of controlling a plug-in hybrid electric vehicle including an electric propulsion system, an engine, and a catalytic converter associated with the engine, the method comprising:
   monitoring a state of charge of a battery of the vehicle when in a charge depletion mode;
   determining a rate of depletion of the state of charge;
   estimating from the rate of depletion a duration of a depletion period representing the time remaining until a minimum state of charge of the battery will be reached;
   determining a duration of a warming period of the catalytic converter;
   comparing the duration of the depletion period and the duration of the warming period; and
   activating the engine if the duration of the depletion period is less than or equal to the duration of the warming period.
2. The method of paragraph 1, comprising monitoring an ambient temperature, and determining the warming period on the basis of the ambient temperature and a predetermined engine speed at which the engine is to be driven during the warming period.
3. The method of paragraph 2, wherein the predetermined engine speed corresponds to engine idling.
4. The method of paragraph 2, wherein the predetermined engine speed is an elevated speed relative to engine idling.
5. The method of paragraph 1, wherein determining the warming period includes obtaining a predetermined look-up value of the warming period.
6. The method of paragraph 1, wherein comparing the duration of the depletion period with the duration of the warming period comprises determining a state of charge threshold and comparing the state of charge threshold with the state of charge of the battery to determine when the duration of the depletion period is less than or equal to the duration of the warming period.
7. The method of paragraph 6, comprising assigning indices to ranges of states of charge, defining a threshold index containing the state of charge threshold, and comparing the state of charge of the battery with a boundary of the threshold index to determine when the duration of the depletion period is less than or equal to the duration of the warming period.
8. The method of paragraph 1, comprising determining a first rate of depletion of the state of charge over a first time period, and determining a second rate of depletion of the state of charge over a second time period, wherein the first time period and the second time period overlap.
9. A control system for a plug-in hybrid electric vehicle including an electric propulsion system, an engine, and a catalytic converter associated with the engine, the control system comprising:
   a sensor arranged to monitor a state of charge of a battery of the vehicle when in a charge depletion mode;
   a processor arranged to determine a rate of depletion of the state of charge, to estimate from the rate of depletion a depletion period representing the time remaining until a minimum state of charge will be reached, and to determine a duration of a warming period of the catalytic converter; and
   an output arranged to activate the engine if the depletion period is less than or equal to the warming period.
10. A computer program product executable on a processor so as to implement the method of paragraph 1.
11. A non-transitory computer readable medium loaded with the computer program product of paragraph 10.
12. A processor arranged to implement the method of paragraph 1, or the computer program product of paragraph 10.
13. A vehicle arranged to implement the method of paragraph 1, or comprising the control system of paragraph 9 or the processor of paragraph 12.

The invention claimed is:

1. A method of controlling a plug-in hybrid electric vehicle having an electric propulsion system, an engine, and a catalytic converter associated with the engine, the vehicle being operable in a charge depletion mode and in a charge sustain mode, and when the vehicle is operating in the charge depletion mode the method comprises:
   estimating a duration of a depletion period representing a time remaining until a minimum state of charge of a battery of the vehicle will be reached;

determining a duration of a warming period of the catalytic converter;

comparing the duration of the depletion period and the duration of the warming period;

activating the engine if the estimated duration of the depletion period is less than or equal to the duration of the warming period; and switching the vehicle from operating in the charge depletion mode to the charge sustain mode when the battery of the vehicle reaches the minimum state of charge.

2. The method of claim 1, further comprising monitoring an ambient temperature, and wherein the determining the duration of the warming period is carried out on the basis of the ambient temperature and a predetermined engine speed at which the engine is to be driven during the warming period.

3. The method of claim 2, wherein the predetermined engine speed corresponds to engine idling.

4. The method of claim 2, wherein the predetermined engine speed is an elevated speed relative to engine idling.

5. The method of claim 2, wherein the determining the duration of the warming period includes determining a cooling rate of the catalytic converter.

6. The method of claim 5, wherein the cooling rate is determined based on a measure of mass air flow across the catalytic converter.

7. The method of claim 1, further comprising monitoring an ambient pressure, and wherein the determining the duration of the warming period is performed on the basis of the ambient pressure.

8. The method of claim 1, wherein the determining the duration of the warming period comprises obtaining a predetermined look-up value of the warming period.

9. The method of claim 1, wherein the determining the duration of the warming period comprises determining time elapsed since the catalytic converter was last operated.

10. The method of claim 1, wherein the comparing the estimated duration of the depletion period with the duration of the warming period comprises determining a state of charge threshold and comparing the state of charge threshold with a state of charge of the battery to determine when the duration of the depletion period is less than or equal to the duration of the warming period.

11. The method of claim 10, further comprising:

assigning indices to ranges of states of charge;

defining a threshold index containing the state of charge threshold; and comparing the state of charge of the battery with a boundary of the threshold index to determine when the duration of the depletion period is less than or equal to the duration of the warming period.

12. The method of claim 1, further comprising determining a first rate of depletion of a state of charge over a first time period, and determining a second rate of depletion of the state of charge over a second time period, wherein the first time period and the second time period overlap.

13. A control system for a plug-in hybrid electric vehicle including an electric propulsion system, an engine, and a catalytic converter associated with the engine, the vehicle being operable in a charge depletion mode and in a charge sustain mode, wherein the control system comprises:

a sensor configured to monitor a state of charge of a battery of the vehicle when the vehicle is in the charge depletion mode;

a processor configured, when the vehicle is in the charge depletion mode, to determine a rate of depletion of the state of charge, to estimate from the rate of depletion a depletion period representing a time remaining until a minimum state of charge will be reached, to determine a duration of a warming period of the catalytic converter, to activate the engine if the depletion period is less than or equal to the warming period, and further configured to switch the vehicle from operating in the charge depletion mode to the charge sustain mode when the battery of the vehicle reaches the minimum state of charge.

14. A computer program product comprising a non-transitory medium having encoded thereon instructions that, when executed by a processor, cause the processor to implement the method of claim 1.

15. A plug-in hybrid electric vehicle comprising the control system of claim 13.

* * * * *